April 29, 1969     L. R. F. THOMPSON     3,441,877
PULSE-WIDTH MODULATORS
Filed June 14, 1966

Inventor:
Lionel Raymond Frank Thompson
By
Karl W. Flocks
Attorney

United States Patent Office 3,441,877
Patented Apr. 29, 1969

3,441,877
PULSE-WIDTH MODULATORS
Lionel R. F. Thompson, Hatfield, England, assignor to Hawker Siddeley Dynamics Limited, Hatfield, England, a company of Great Britain
Filed June 14, 1966, Ser. No. 557,440
Claims priority, application Great Britain, June 14, 1965, 25,099/65
Int. Cl. H03k 7/08, 5/04
U.S. Cl. 332—9       11 Claims This invention is concerned with improvements in or relating to pulse width modulators.

According to one aspect of the invention, there is provided a pulse width modulator comprising means for combining a first electrical input signal and at least one second electrical input signal to form an effective electrical input signal, an integrating circuit responsive to the said effective input signal to generate an electrical output signal the magnitude of which is a function of the time integral of the magnitude of the said effective input signal, first switching means arranged to generate the said second input signal and arranged to respond to the magnitude of the said output signal to assume a first state to switch the magnitude of the said second input signal to a first value as a result of that output signal attaining a first selected value and to assume a second state to switch the magnitude of the second input signal to a second value as a result of that output signal attaining a second selected value different from the first selected value, the said first and second values of the magnitude of the said second input signal being so selected that, each time the first switching means operates, the polarity of the said effective input signal is reversed such that oscillation occurs, and second switching means arranged to operate in synchronism with the first switching means to switch the magnitude of an electrical load signal between first and second different values, whereby the said load signal is pulse width modulated and has an average value which is a function of the magnitude of the said first input signal.

Preferably, the ratio of the first and second values of the second input signal is selected to be equal to the ratio of the said first and second values of the said load signal, whereby the average value of the load signal is proportional to the magnitude of the said first input signal.

Preferably, the first switching means includes at least one first switch arranged to assume a first or a second condition according as the first switching means assumes its first state or its second state.

In addition, or alternatively, the second switching means may include at least one second switch arranged to assume a first or a second condition according as the first switching means assumes its first state or its second state.

Preferably, the first and the second switching means include a common single bi-state device arranged to respond to the magnitude of the said output signal to assume a first condition as a result of that output signal attaining its said first selected value and to assume a second condition as a result of that output signal attaining its said second selected value, the bi-state device being arranged to control the operation of the said first switch or switches to switch the magnitude of the second input signal to its said first and second values respectively according as the bi-state device assumes its first or its second condition and being arranged to control the operation of the said second switch or switches to switch the magnitude of the said load signal to its said first and second selected values respectively according as the bi-state device assumes its first or its second condition.

Conveniently, the first switching means includes the said first switch or switches arranged to effectively control the connection of first and second different voltage sources to the input of the integrating circuit by way of at least one resistor such that the said second input signal is an electric current and assumes its said first and second different values respectively according as the first switching means assumes its said first or its said second states. The voltage of one of the said first and second voltage sources may be zero.

Alternatively, the first switching means may include the said first switch or switches arranged to effectively control the connection of first and second different current sources to the input of the integrating circuit. One of the said first and second current sources may be a source of zero current.

Conveniently, the second switching means includes the said second switch or switches arranged to effectively control the connection of third and fourth different voltage sources, or of third and fourth different current sources, to a load to thereby generate the said load signal. In one arrangement, the voltage of one of the third and fourth voltage sources, or the current supplied by one of the third and fourth current sources, is zero.

According to further aspects of the invention, there is provided an amplifier, or an inverter, or a device for obtaining an electrical signal which is a function of the square root of an electrical input signal, or a device for obtaining an electrical signal which is a function of the product of two electrical input signals, or a device for obtaining an electrical signal which is a function of the ratio of two electrical input signals, or a device for obtaining an electrical signal which is a function of the time integral of an electrical input signal, which includes a pulse width modulator according to the invention.

Several embodiments of the invention will now be described with reference to the accompanying drawings of which.

Figure 1:
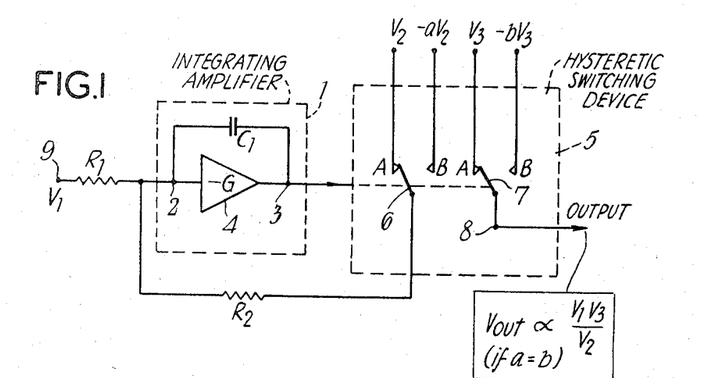
FIGURE 1 is a block diagram of a pulse width modulator according to the invention.

Referring to FIGURE 1, the pulse width modulator includes an integrating amplifier 1 having an input terminal 2 and an output terminal 3. The integrating amplifier includes a high-gain inverting amplifier unit 4 with a capacitor $C_1$ connected between the terminals 3 and 2, so that if an electrical input signal is supplied to the input terminal 2, the resultant electrical output signal appearing at the output terminal 3 is of the relatively opposite polarity to that of the electrical input signal and has a magnitude proportional to the time integral of the electrical input signal.

Figure 2:
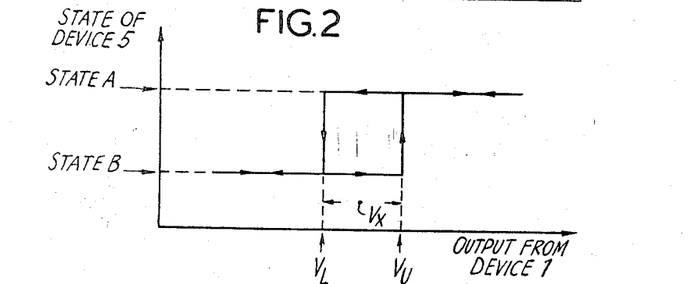
FIGURES 2, 3, 4(A), 4(B), 5(A) and 5(B) are graphs illustrating the operation of the modulator of FIGURE 1.

The modulator also includes a two-state hysteretic switching device 5 responsive to the output of the integrating amplifier 1. The essential nature of the device 5 is illustrated by FIGURE 2: when the magnitude of the output of the integrating amplifier 1 attains an upper value $V_U$, the device 5 assumes a first state ("state A") in which it remains until the magnitude of the output of the integrating amplifier 1 falls to a lower value $V_L$, whereupon the device 5 assumes its second state ("state B"), in which state the device 5 will remain until it is again forced (as above) to assume its state A.

The device 5 includes two change-over switches 6 and 7. The switch 6 controls the alternative connection of two electrical sources, through a resistor $R_2$, to the input terminal 2: the arrangement is such that when the device 5 is in its state A, a first source of potential $V_2$ is connected, through the resistor $R_2$, to the terminal 2 while, when the device 5 is in its state B, a second source of potential $-aV_2$ is substituted for the first source. The switch 7 controls the alternative connection of two further electrical sources to an output terminal 8: the arrangement is such that when the device 5 is in its state A, a third source of potential $V_3$ is connected to the terminal 8 while, when the device 5 is in its state B, a fourth source of potential $-bV_3$ is substituted for the third source.

The input terminal 9 of the modulator is assumed to be connected to an electrical source of potential $V_1$, and the terminal 9 is connected to the terminal 2 via a resistor $R_1$.

Provided certain conditions (discussed below) are fulfilled, the circuit of FIGURE 1 will oscillate continuously. Thus, when the device 5 is in its state A, the net input signal to the terminal 2 is arranged to be positive: consequently, the output signal from the terminal 3 will gradually fall to the lower value $V_L$, whereupon the device 5 will assume its state B (and switches 6 and 7 will change their positions). When the device 5 is in its state B, the net input signal to the terminal 2 is arranged to be negative: consequently, the output signal from the terminal 3 will gradually rise to the upper value $V_U$, whereupon the device 5 will assume its state A (and switches 6 and 7 will return to their original positions).

Figure 4A:
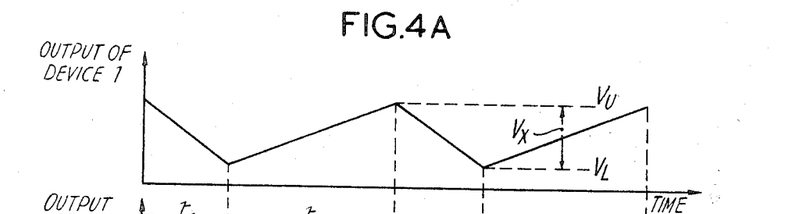
Figure 4B:
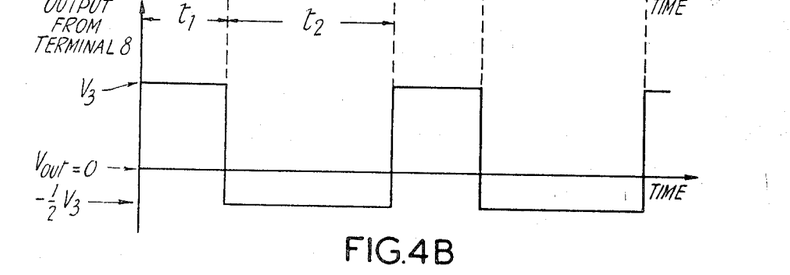
Figure 5A:
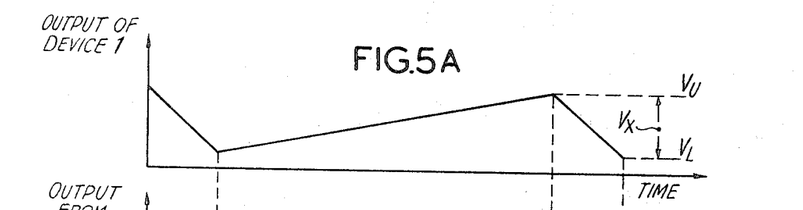
Figure 5B:
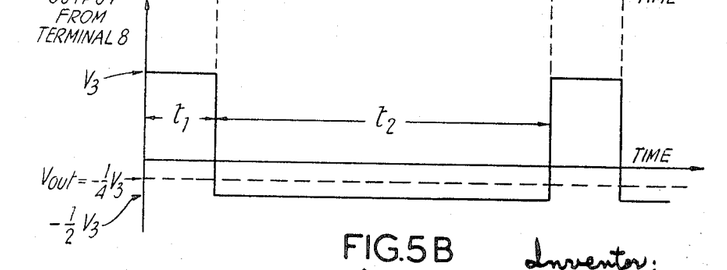

If the circuit of FIGURE 1 is arranged to oscillate in this way, it will be clear that the potential of the output terminal 8 will alternate between the values $V_3$ and $-bV_3$, so that the output from the terminal 8 will be a rectangular wave of the form of FIGURES 4(B) and 5(B). From the theory to be given below, it will be seen that the apparatus of FIGURE 1 is essentially a pulse-width modulator in which the mark-to-space ratio $m$ of the rectangular wave of potential at the output terminal 8 is determined by $V_1$, $V_2$ and $a$. Furthermore, it will be shown that the average value $V_{out}$ of the potential of the terminal 8 is a function of $V_1$, $V_2$, $V_3$, $a$ and $b$, such that the circuit of FIGURE 1 can be arranged to operate as an amplifier or to perform certain other useful functions.

Referring to FIGURE 1, it will be assumed that the integrating amplifier 1 responds to the magnitude of the net current supplied to its input terminal 2 through the resistors $R_1$ and $R_2$, and that the potential of the terminal 2 is zero.

When the device 5 is in its state A, the net current $i_A$ supplied to the terminal 2 is thus:

$$i_A = \frac{V_1}{R_1} + \frac{V_2}{R_2} \qquad (1)$$

When the device 5 is in its state A, the net current $i_A$ supplied to the terminal 2 is:

$$i_B = \frac{V_1}{R_1} - \frac{aV_2}{R_2} \qquad (2)$$

In order that the circuit of FIGURE 1 may oscillate as described above, it is necessary that:

$$i_A > 0 \text{ and } i_B < 0 \qquad (3)$$

Thus, if $V_2 > 0$, the necessary condition for oscillation is:

$$-\frac{R_1}{R_2}V_2 < V_1 < \frac{aR_1}{R_2}V_2 \qquad (4)$$

If $V_U - V_L = V_X$, where $V_X$ is the hysteresis voltage of the device 5, then the time $t_1$ taken for the output of the integrating amplifier 1 to decrease from the upper value $V_U$ to the lower value $V_L$ (i.e., the time $t_1$ for which the device 5 remains in its state A) is:

$$t_1 = \frac{KV_X}{\frac{V_1}{R_1} + \frac{V_2}{R_1}} \qquad (5)$$

where K is a constant of the integrating amplifier 1.

The time $t_2$ taken from the output of the integrating amplifier to increase from the lower value $V_L$ to the upper value $V_U$ (i.e., the time $t_2$ for which the device 5 remains in its state B) is:

$$t_2 = \frac{KV_X}{\frac{aV_2}{R_2} - \frac{V_1}{R_1}} \qquad (6)$$

The frequency $f$ of the oscillation will be:

$$f = \frac{1}{t_1 + t_2} = \frac{(V_2 + cV_1)(aV_2 - cV_1)}{KR_2V_2V_X(1+a)} \qquad (7)$$

where $$c = R_2/R_1 \qquad (8)$$

Figure 3:
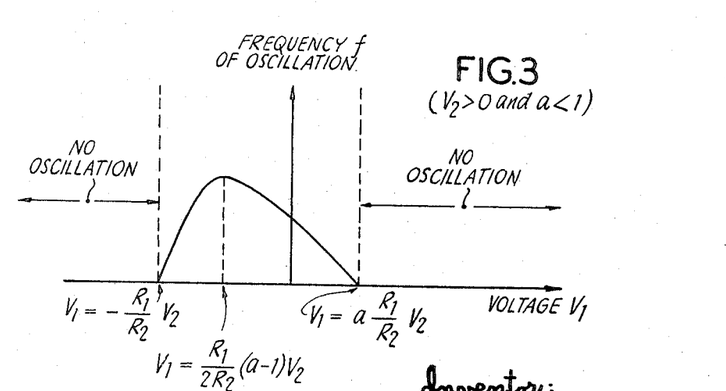

FIGURE 3 shows the manner in which the frequency $f$ varies with the input voltage $V_1$, for the case where $V_2 > 0$ and $a < 1$.

Now the average value $V_{out}$ of the potential of the output terminal 8 is given by:

$$V_{out} = \frac{V_3 t_1 - bV_3 t_2}{t_1 + t_2} = \frac{m-b}{m+1}V_3 \qquad (9)$$

where $$m = t_1/t_2 \qquad (10)$$

and where $m$ is the mark-to-space ratio of the electrical signal appearing at the output terminal 8.

Now, from Equations 5, 6 and 10:

$$m = \frac{aV_2 - cV_1}{V_2 + cV_1} \qquad (11)$$

so that $$V_{out} = V_3\left(\frac{(a-b)V_2 - cV_1(1+b)}{V_2(1+a)}\right) \qquad (12)$$

In a particularly simple case, where $a = b$:

$$V_{out} = -\frac{cV_1V_3}{V_2} \qquad (13)$$

In order to understand the significance of the above theory, consider the particular case of FIGURE 1 where $V_2$ and $V_3$ are held constant and positive, $a = b = \frac{1}{2}$, and the input voltage $V_1$ is held constant but takes up different values in turn.

In the case where $V_1 = 0$, we find (putting $T = KV_x R_2 / V_2$)

that the circuit of FIGURE 1 oscillates at a frequency $f = \frac{1}{3}T$, with $t_1 = T$ and $t_2 = 2T$. This is illustrated by FIGURES 4(A) and 4(B), which respectively show the output of the integrating amplifier 1 and the potential of the terminal 8, plotted against time. It will be observed that, although the rectangular wave of potential at the terminal 8 is non-symmetric, the average value ($V_{out}$) of that potential is zero.

In the case where $$V_1 = \frac{aR_1}{2R_2} V_2$$

(i.e., half of the maximum value permitted by Equation 4), we find that the circuit of FIGURE 1 oscillates at a frequency of $f = \frac{5}{24}T$, with $t_1 = 4T/5$ and $t_2 = 4T$. This is illustrated by FIGURES 5(A) and 5(B), which are respectively similar to FIGURES 4(A) and 4(B). It will be observed that, in this case, the average value $V_{out}$ of the potential of the terminal 8 is not zero, but is given by $V_{out} = -V_3/4$. Thus, the change of magnitude of $V_1$ from zero to a positive value causes the average value $V_{out}$ of the potential of the terminal 8 to change from zero to a negative value.

In the more general case, if $V_2$ and $V_3$ are held constant, Equation 13 shows that $$V_{out} = -dV_1 \qquad (14)$$

where $d$ is a constant. In other words, the circuit of FIGURE 1 then behaves basically as an amplifier, in that the average value $V_{out}$ of the potential of the terminal 8 will be proportional to the magnitude of the potential $V_1$ applied to the input terminal 9.

It will thus be clear that if the output terminal 8 is connected through a suitable low-pass filter to a load, then the filter will remove the carrier-frequency oscillations of the frequency $f$ such that a current will flow in the load, which current has a magnitude which is proportional to $V_{out}$ and therefore proportional to $V_1$. This is the basis of an amplifier according to the invention.

The circuit of FIGURE 1 will only act as an amplifier in this manner, provided that the frequency $f$ of oscillation of the circuit is sufficiently high, compared with the rate of change of $V_1$ with time. The frequency $f$ should be made as high as practicable (for example, 20 kc./s), to permit the low-pass filter to be of a simple form.

Where the frequency $f$ is relatively high, the switches 6 and 7 should be electronic switches, for example electronic valves or semiconductor devices (e.g., transistors or silicon-controlled-rectifiers).

It is to be understood that, in the general application of the circuit of FIGURE 1, the voltages $V_2$ and $V_3$ and the multiplying factors $a$ and $b$ need not be constant, but may vary with time. In such case, the theory given above (in particular, Equations 12 and 13) will still hold true, provided that the frequency $f$ of oscillation is sufficiently high, compared with the rate of change of $V_2$, $V_3$, $a$ and $b$ with time. Examples of such applications of the circuit of FIGURE 1 are described below.

It is to be further understood that the circuit of FIGURE 1 may be modified in any obvious manner. In particular, the switch 6 and the resistor $R_2$ may be replaced by any other suitable electric circuit which will cause the output of the integrating amplifier 1 to rise and fall alternately. Further, the input signal to the terminal 9 may be supplied to the amplifier 1 other than through the resistor $R_1$. Further, the arrangement of the switch 7 may be different from that shown: the basic requirement is that operation of the switch 7 shall switch an electrical load signal between two selected values.

Figure 6:
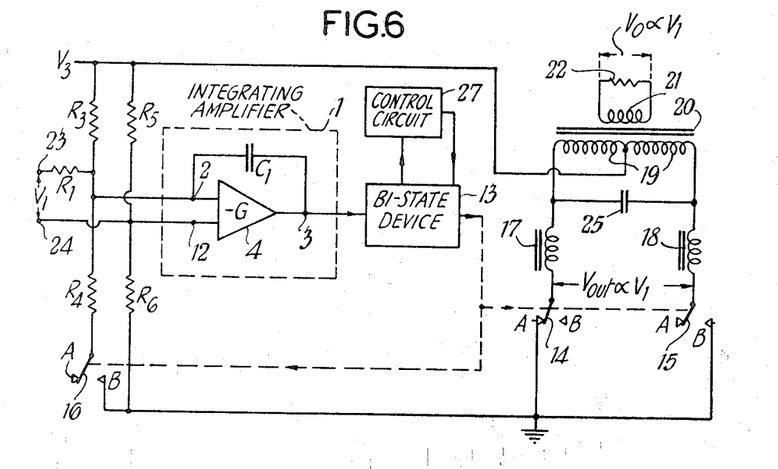
FIGURE 6 is a circuit diagram of an amplifier or inverter according to the invention.

The circuit of FIGURE 6 is of an A.C. amplifier, or inverter, constructed according to the invention, and is substantially similar to the pulse width modulator of FIGURE 1.

In the case of FIGURE 6, the integrating amplifier 1 is similar to the amplifier 1 of FIGURE 1, but the amplifier unit 4 has two input terminals 2 and 12. The input terminal 2 is similar to the terminal 2 described with reference to FIGURE 1, being the inverting input of the amplifier unit 4. The input terminal 12, however, constitutes a non-inverting input of the amplifier unit 4.

In the circuit of FIGURE 6, and in certain of the remaining circuits to be described, it will be assumed that the amplifier unit 4 has a relatively high gain, such that the potentials of the input terminals 2 and 12 may be considered to be always substantially equal, and such that the amplifier unit 4 may be considered to draw negligibly small currents from the input terminals 2 and 12.

The output from the integrating amplifier 1 is supplied to a bi-state device, indicated at 13, which forms a part of the switching device 5 of the circuit of FIGURE 1. The bi-state device is arranged to respond to the magnitude of the output signal from the integrating amplifier 1, and to assume the first state A (referred to with reference to FIGURE 1) when the magnitude of that output signal reaches the upper value $V_U$ referred to above. Thereafter, the bi-state device remains in its state A until the said output signal from the integrating amplifier 1 attains the lower value $V_L$, whereupon the bi-state device assumes its second state, the state B. Thereafter, the bi-state device remains in its state B until it is caused to assume its state A.

The bi-state device may be of any convenient form, but in one suitable form it is a Schmitt trigger circuit.

The bi-state device controls the opertion of three electrical switches 14, 15, and 16, whereby each of the switches 14, 15 and 16 assumes one or the other of its states, according as the bi-state device is in its state A or state B respectively.

As shown in FIGURE 6, the movable contacts of the switches 14 and 15 are respectively connected, via inductances 17 and 18, to the opposite ends of the centre-tapped primary winding 19 of an output transformer 20, of which the secondary winding 21 is connected to a load resistor 22. A capacitor 25 is connected between the opposite ends of the primary winding 19. The centre-tap of the primary winding 19 is connected to a D.C. supply line at a potential $V_3$.

The arrangement is such that, when the bi-state device 13 is in its state A, the movable contact of the switch 14 connects the inductance 17 to earth, while, when the bi-state device 13 is in its state B, the movable contact of the switch 15 connects the inductance 18 to earth.

A potential divider, comprising the two series-connected resistors $R_5$ and $R_6$, is connected between earth and the D.C. supply line at the potential $V_3$, the common point of the two resistors $R_5$ and $R_6$ being connected to the non-inverting input terminal 12.

The inverting input terminal 2 is connected, via a resistor $R_3$, to the D.C. supply line at the potential $V_3$, and is also connected, via a resistor $R_4$ and the electrical switch 16, to earth. The arrangement is such that, when the bi-state device 13 is in its state A, the switch 16 disconnects the resistor $R_4$ from earth, while, when the bi-state device 13 is in its state B, the switch 16 connects the resistor $R_4$ to earth.

The input terminals for the apparatus of FIGURE 6 are indicated at 23 and 24. The terminal 23 is connected, via a resistor $R_1$, to the terminal 2, and the terminal 24 is directly connected to the terminal 12. An alternating electrical input signal of voltage $V_1$ is assumed to be applied between the input terminals 23 and 24.

A consideration of the circuit of FIGURE 6 will show that it is essentially a circuit of the form of that of FIGURE 1, and will operate similarly to the circuit of FIG- URE 1. Thus, for example, the switches 14 and 15 of FIGURE 6 replace the single switch 7 of FIGURE 1, and it will be seen that the switches 14 and 15 effectively act to alternately earth the opposite ends of the primary winding 19, thus effectively changing the supply voltage to that primary winding from $V_3$ to $-V_3$, i.e. the switches 14 and 15 act similarly to the switch 7 of FIGURE 1, for the case where the multiplying factor $b$ is a constant equal to unity.

Furthermore, in the circuit of FIGURE 6, the resistor $R_1$ is essentially similar to the resistor $R_1$ of FIGURE 1, while the resistors $R_3$, $R_4$, $R_5$ and $R_6$ of FIGURE 6 replace the resistor $R_2$ of FIGURE 1.

The circuit of FIGURE 6 is required to effectively have the multiplying factors $a$ and $b$ (referred to above) equal and constant, and equal to unity, and the effective potentials $V_2$ and $V_3$ (as described with reference to FIGURE 1) equal and constant, so that the circuit will behave as an amplifier, according to the expression 14 given above.

It can be shown that this will be so, provided that in the circuit of FIGURE 6, $$R_3R_6=2R_4R_5 \quad (15)$$

In other words, provided that Equation 15 is satisfied, then the feedback circuit of FIGURE 6 (comprising the resistors $R_3$, $R_4$, $R_5$ and $R_6$ and the switch 16) will be electrically equivalent to the feedback circuit of FIGURE 1 (comprising the resistor $R_2$ and the switch 6) for the case (FIGURE 1) where $a=1$. A brief explanation of this is as follows. Referring to FIGURE 1 for the case where $a=1$ and $V_1=0$, it will be seen that the currents flowing through the resistor $R_2$ when the device 5 is in its states A and B respectively are $i_A=V_2/R_2$ and $$i_B=-V_2/R_2$$

which are equal and opposite currents. Now referring to FIGURE 6, the potential $V_6$ of the terminal 12 is set by the potential divider $(R_5+R_6)$ and is $$V_6=R_6V_3/(R_5+R_6)$$

with the assumptions mentioned above, this will also be the potential of the terminal 2. Thus (FIGURE 6), when the device 13 is in its state A, the input current $i_A'$ to the terminal 2 will be equal to the current through the resistor $R_3$ so that $i_A'=(V_3-V_6)/R_3$. When (FIGURE 6) the device 13 is in its state B, the input current $i_B'$ to the terminal 2 will be equal to $i_A'$ minus the current which flows through the resistor $R_4$, i.e. $i_B'=i_A'-V_6/R_4$. Comparing the expressions for $i_A'$ and $i_B'$, it will be found that these have equal and opposite values if Equation 15 is satisfied.

Figure 7:
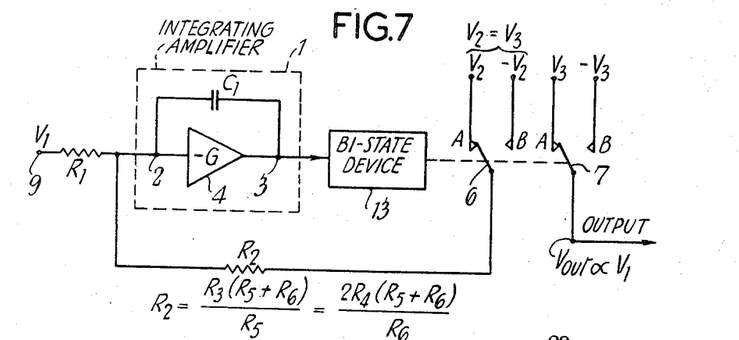
FIGURE 7 is a block diagram illustrating the operation of the circuit of FIGURE 6.

The circut of FIGURE 7 shows the effective arrangement of the circuit of FIGURE 6, in the form of the basic circuit of FIGURE 1.

Thus, provided that the expression 15 is satisfied, the circuit of FIGURE 6 will behave according to the expression 14 and consequently the potential difference $V_0$ occurring across the load resistor 22 will be given by $$V_0=eV_1 \quad (16)$$

where $e$ is a constant.

The output signal $V_0$ will thus be an amplified version of the input signal $V_1$ supplied to the input of the apparatus of FIGURE 6. The circuit of FIGURE 6 thus acts as an A.C. amplifier or inverter.

It will be understood that the apparatus of FIGURE 6 is arranged to oscillate at the (carrier) frequency $f$ given by the expression 7, which frequency will vary continuously, as a function of the instantaneous magnitude $V_1$ of the alternating input voltage. The components of the circuit of FIGURE 6 are so selected that the carrier frequency $f$ is always relatively high compared with the frequency of the input signal $V_1$, whereby the inductances 17 and 18 and the capacitor 25 constitute filters which effectively allow only signals of the frequency of the input signal $V_1$ to pass to the load resistor 22.

Conveniently, the circuit of FIGURE 6 includes a control circuit 27 arranged to vary the frequency $f$ of oscillation of the circuit, by adjustment of the magnitude of the hysteresis voltage $V_X$ of the bi-state device 13. (It will be seen, from the expression 7, that the frequency $f$ varies inversely as the magnitude of $V_X$.) In one arrangement, the hysteresis voltage $V_X$ is varied as a function of the mark-to-space ratio $m$ of the output signal of average value $V_{out}$, effectively developed by the switches 14 and 15.

Figure 8:
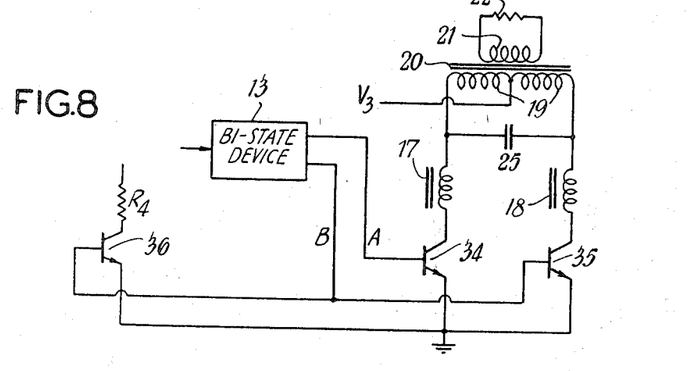
FIGURE 8 is an incomplete circuit diagram showing one form of the circuit of FIGURE 6.

It is to be understood that the circuit of FIGURE 6 may be modified, as described above with reference to FIGURE 1. The electrical switches 14, 15 and 16 are preferably electronic switches, such as electronic valves or semiconductor devices (for example, transistors or silicon-controlled-rectifiers). Thus, FIGURE 8 shows a part of the circuit of FIGURE 6, for the case where the switches 14, 15 and 16 are respectively constituted by transistors 34, 35 and 36: the arrangement is such that, when the bi-state device 13 is in its state A, it so biasses the bases of the transistors 34, 35 and 36 that the transistor 34 is switched on and the transistors 35 and 36 are switched off, while, when the bi-state device is in its state B, it so biasses the bases of the transistors 34, 35 and 36 that the transistor 34 is switched off and the transistors 35 and 36 are switched on.

Figure 9:
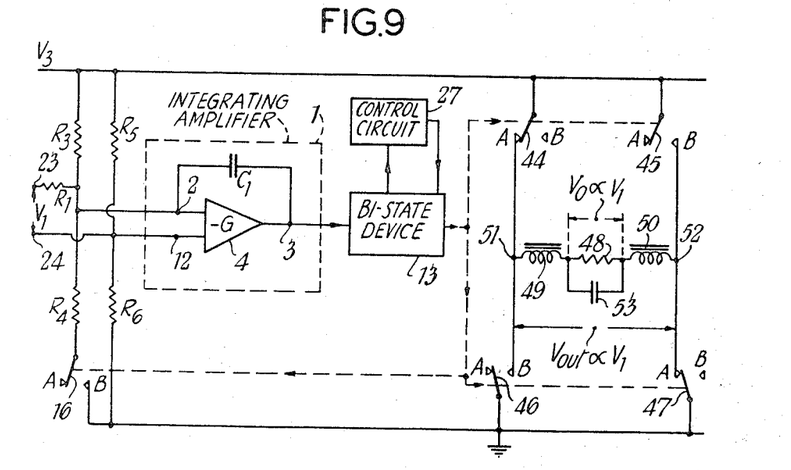
FIGURE 9 shows a modified form of the circuit of FIGURE 6.

The circuit of FIGURE 9 is very similar to the circuit of FIGURE 6, and corresponding circuit elements are thus denoted by the same reference numerals and letters. The circuit of FIGURE 9 differs from that of FIGURE 6, in that the two electrical switches 14 and 15 are replaced by four electrical switches 44, 45, 46 and 47, while a load resistor 48 is connected, in series with two inductances 49 and 50, between a pair of terminals 51 and 52. The movable contacts of the switches 44 and 45 are connected to the D.C. supply line of potential $V_3$, while the movable contacts of the switches 46 and 47 are connected to earth. The switches 44–46 are so arranged that, when the bi-state device 13 is in its state A, the terminal 51 is connected to the said supply line and the terminal 52 is connected to earth, while, when the bi-state device 13 is in its state B, the terminal 51 is connected to earth and the terminal 52 is connected to the said supply line. The load resistor 48 is shunted by a capacitor 53 which, together with the inductances 49 and 50, acts as a low-pass filter which is intended to prevent signals of the carrier frequency $f$ of oscillation of the circuit, and the upper harmonics thereof, from reaching the load resistor 48.

Consideration of the circuit of FIGURE 9 will show that its acts substantially similarly to the circuit of FIGURE 6, and its operation is similarly illustrated by the circuit of FIGURE 7. In particular, it will be seen that the potential difference between the terminals 51 and 52 is reversed in polarity each time the bi-state device 13 changes its state.

In summary, the average value of the pulse width modulated square-wave of voltage which appears between the points 51 and 52 is given by the expression 14, i.e.

$$V_{out}=-dV_1 \quad (14)$$

so that the potential difference $V_0$ developed across the load will be proportional to $V_1$.

Similarly to the circuit of FIGURE 6, the circuit of FIGURE 9 will thus act as an A.C. amplifier or as an inverter. However, it will be clear that the circuit of FIGURE 9 will also act as a D.C. amplifier. The remarks made above, in relation to the circuit of FIGURE 6, also apply to the circuit of FIGURE 9.

Figure 10:
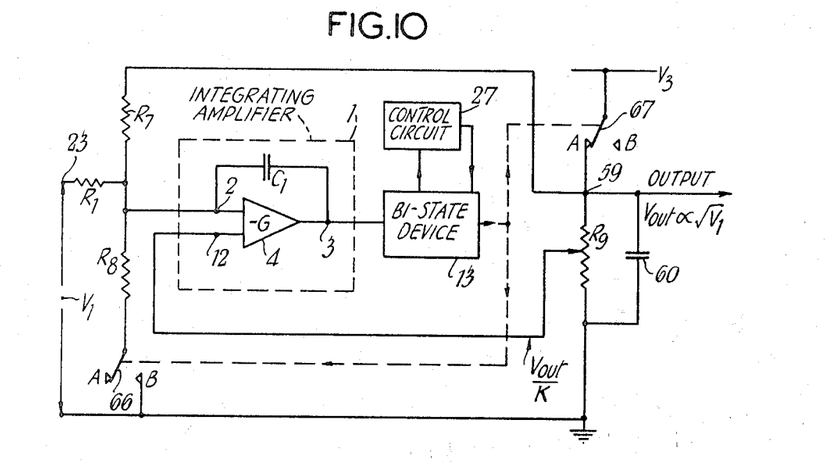
FIGURE 10 is a circuit diagram of a device, according to the invention, for providing an electrical signal which is a function of the square root of an electrical input signal.

FIGURE 10 is a circuit diagram of a device, according to the invention, for providing an electrical signal which is a function of the square root of an electrical input signal.

The circuit of FIGURE 10 is essentially a pulse width modulator similar to the pulse width modulators of FIG- URES 1, 6, 7, 8 and 9, and corresponding circuit elements are therefore denoted by the same reference numerals and letters.

Referring to FIGURE 10, one input terminal 23 of the complete circuit is connected to the inverting input terminal 2 of the amplifier unit 4, via the resistor $R_1$. The input potential difference $V_1$ is connected between earth and the terminal 23.

The output terminal 59 of the complete circuit is connected, via a resistor $R_7$, to the inverting input terminal 2, and is also connected, via a potentiometer $R_9$, to earth. The potentiometer $R_9$ is shunted by a capacitor 60. The tapping of the potentiometer $R_9$ is connected to the non-inverting input terminal 12 of the amplifier unit 4.

In the circuit of FIGURE 10, the two electrical switches 66 and 67 correspond respectively to the two electrical switches 6 and 7 of the circuit of FIGURE 5. The movable contact of the switch 67 is connected to a D.C. supply line of potential $V_3$, while the movable contact of the switch 66 is connected, via a resistor $R_8$, to the inverting input terminal 2 of the amplifier unit 4.

The arrangement of the switches 66 and 67 is such that, when the bi-state device 13 is in its state A, the switch 66 disconnects the resistor $R_8$ from earth, and the switch 67 connects the output terminal 59 to the D.C. supply line of potential $V_3$. When the bi-state device 13 is in its state B, the switch 66 connects the resistor $R_8$ to earth, while the switch 67 disconnects the output terminal 59 from the said D.C. supply line.

Comparing the circuit of FIGURE 10 with that of FIGURE 1, and, in particular, comparing the operation of the switch 67 (FIGURE 10) with that of the switch 7 (FIGURE 1), it will be seen that the switch 67 alternately connects and disconnects the said D.C. supply line to and from the output terminal 59, i.e., in the notation employed above with reference to FIGURE 1, the circuit of FIGURE 10 is such that the multiplying factor $b$ is a constant equal to zero.

Thus, the potential of the terminal 12 (and thereby the potential of the terminal 2) will be held, by the potentiometer $R_9$, at a fraction of $V_{out}$, the average potential of the output terminal 59. It will be assumed that the average potential of the terminals 2 and 12 thus becomes equal to $V_{out}/K$. Now the circuit of FIGURE 10 is required to operate according to the expression 13 discussed above, i.e. t is required that (in the circuit of FIGURE 10) the average value $V_{out}$ of the potential of the output terminal 59 shall be given by $$V_{out} = -\frac{cV_1V_3}{V_2} \quad (13)$$

and the condition for this to be so is (as described above) that the multiplying factors $a$ and $b$ shall be constant and equal. It is thus required, in the circuit of FIGURE 10, that $a=b=0$, and it can be shown that this will be so, if $$R_1(K-1) = R_7 \quad (17)$$

(Equation 17 can be derived in a similar manner to that in which Equation 15 was derived above for the case of FIGURE 6.)

It can be shown that, provided Equation 17 is satisfied, then the average value of the potential of the output terminal 59 is given by $$V_{out} = \sqrt{V_1}\sqrt{\frac{KR_8V_3}{R_1}} \quad (18)$$

We thus see that, provided that the conditions mentioned above hold true, then the average value $V_{out}$ of the potential of the output terminal 59 of the circuit of FIGURE 10 will be proportional to the square root of the potential $V_1$ applied between earth and the input terminal 23.

It will be understood that the circuit of FIGURE 10 may be modified as discussed above in relation to the circuit of the preceding figures. In particular, the switches 66 and 67 may be electronic switches as mentioned above.

Figure 11:
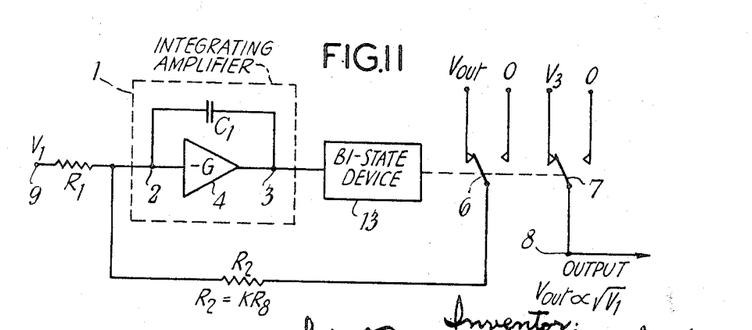
FIGURE 11 is a block diagram illustrating the operation of the circuit of FIGURE 10.

FIGURE 11 is a circuit which shows the effective arrangement of the circuit of FIGURE 10, in the form of the basic circuit of FIGURE 1.

Figure 12:
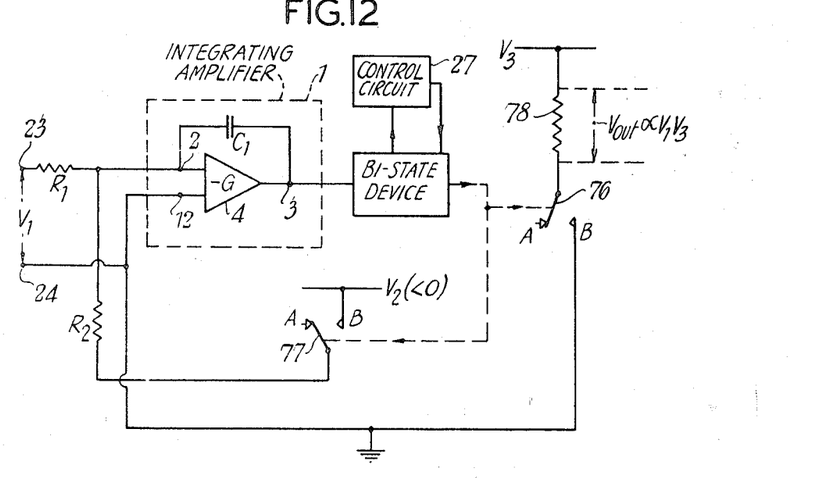
FIGURE 12 is a circuit diagram of a device, according to the invention, for providing an electrical signal which is a function of the product of two electrical input signals.

FIGURE 12 is a circuit diagram of a device, according to the invention, for providing an electrical signal which is a function of the product of two electrical input signals.

The circuit of FIGURE 12 is essentially a pulse width modulator similar to the pulse width modulators of FIGURES 1, 6, 7, 8 and 9, and corresponding circuit elements are therefore denoted by the same reference numerals and letters.

Referring to FIGURE 12, the non-inverting input terminal 12 of the amplifier unit 4 is connected to earth. The two electrical switches 76 and 77 correspond respectively to the two switches 6 and 7 of the circuit of FIGURE 1. The arrangement is such that, when the bi-state device 13 is in its state A, the switch 76 interrupts the connection of the load resistor 78 between earth and a supply line of potential $V_3$ and the switch 77 interrupts the connection of a resistor $R_2$ between the inverting input terminal 2 and a D.C. supply line of potential $V_2$ (where $V_2 < 0$). When the bi-state device is in its state B, the switch 76 connects the load resistors 78 between earth and the said supply line of potential $V_3$, and the switch 77 connects the inverting input terminal 2 to the said D.C. supply line of potential $V_2$, via the resistor $R_2$.

Comparing the circuits of FIGURES 12 and 1, it will be seen that, in the circuit of FIGURE 12, the effective values of the multiplying factors $a$ and $b$ referred to above are given by $a=b=0$. The average value $V_{out}$ of the potential difference appearing across the load resistor 78 will therefore be given by the expression 13, i.e., $$V_{out} = -cV_1V_3/V_2 \quad (13)$$

Thus, in the circuit of FIGURE 12, $$V_{out} = gV_1V_3 \quad (19)$$

where $g$ is a constant (provided that $V_2$ is constant).

The average value $V_{out}$ of the potential difference appearing across the load resistor 78 is thus proportional to the product of the potentials $V_1$ and $V_3$. It should be noted that $V_1$ and $V_3$ need not be constant, but may vary or alternate with time.

In a particular application of the circuit of FIGURE 12, the potentials $V_1$ and $V_3$ are arranged to be respectively proportional to the current and the voltage in an electric circuit, whereby the output signal $V_{out}$ is a measure of the power developed in the electric circuit.

It is to be understood that the circuit of FIGURE 12 may be modified, as described above with reference to the preceding figures.

Figure 13:
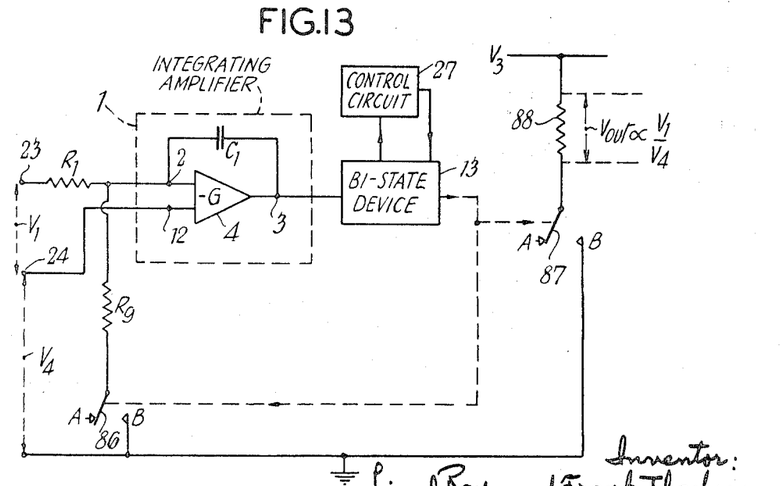
FIGURE 13 is a circuit diagram of a device, according to the invention, for providing an electrical signal which is a function of the ratio of two electrical input signals.

FIGURE 13 is a circuit diagram of a device according to the invention, for providing an electric signal which is a function of the ratio of two electric input signals.

The circuit of FIGURE 13 is essentially a pulse width modulator, similar to the pulse width modulators of FIGURES 1, 6, 7, 8 and 9, and corresponding circuit elements are therefore denoted by the same reference numerals and letters.

Referring to FIGURE 13, one input terminal 23 of the complete circuit is connected, via the resistor $R_1$, to the inverting input terminal 2 of the amplifier unit 4. The other input terminal 24 is directly connected to the non-inverting input terminal 12 of the amplifier unit 4.

The two electrical switches 86 and 87 correspond respectively to the switches 6 and 7 of the circuit of FIGURE 5. The arrangement of the switches 86 and 87 is such that, when the bi-state device 13 is in its state B, the switch 86 connects the inverting input terminal 2 to earth, via a resistor $R_9$, while the switch 87 connects a load resistor 88 between earth and a D.C. supply line of potential $V_3$. When the bi-state device 13 is in its state A, both of the connections mentioned in the preceding sentence are interrupted.

The circuit of FIGURE 13 is very similar to the circuit of FIGURE 1, and it can be shown that the average value $V_{out}$ of the potential difference appearing across the load resistor 88 is given by $$V_{out} = hV_1/V_4 \qquad (20)$$

where $h = R_9V_3/R_1$ and will be a constant if $V_3$ is held constant, and where $V_1$ is the potential difference applied between the input terminals 23 and 24, and where $V_4$ is the potential difference applied between the input terminal 24 and earth.

Figure 13A:
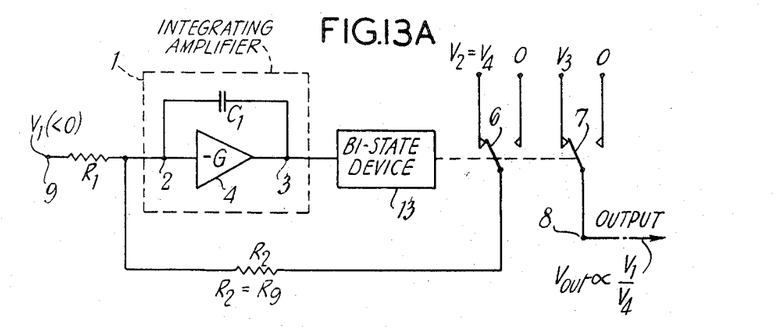
FIGURE 13A is a block diagram illustrating the operation of the circuit of FIGURE 13.

FIGURE 13A is a circuit which shows the effective arrangement of the circuit of FIGURE 13, in the form of the basic circuit of FIGURE 1.

In a particular application of the invention, the potential differences $V_1$ and $V_4$ may be D.C. electrical signals which are respectively proportional to two alternating electrical currents and/or voltages which are phase-displaced by a phase angle $\phi$, such that $V_1V_4 = j \cos \phi$, where $h$ is a constant. (The D.C. signals referred to may be derived from suitable phase-sensitive rectifiers.) In such case, the average value $V_{out}$ of the potential difference developed across the load resistor 88 will be proportional to $\cos \phi$ (provided that $V_3$ is constant).

Figure 14:
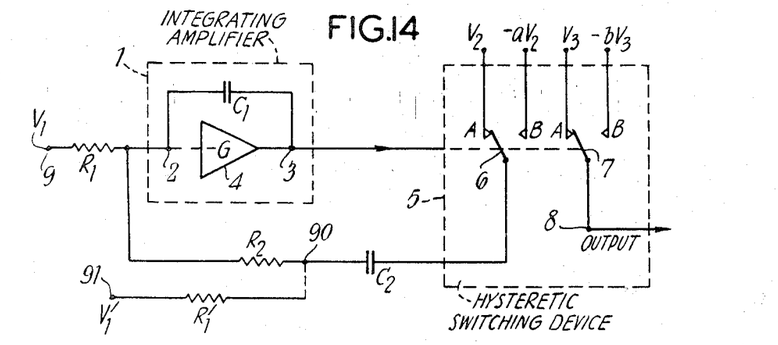
FIGURE 14 shows a modified form of the pulse-width modulator of FIGURE 5.

FIGURE 14 shows a modified form of the pulse width modulator of FIGURE 1. The circuit of FIGURE 14 is identical with that of FIGURE 1, except in that a capacitor $C_2$ is connected between the electrical switch 6 and the resistor $R_2$.

If a mathematical analysis of the circuit of FIGURE 14 is made, similar to that given above for the similar circuit of FIGURE 1, then it may be shown that if, in the circuit of FIGURE 14, $a = b$, then the average value $V_{out}$ of the potential of the output terminal 8 of the circuit of FIGURE 14 is given by $$V_{out} = -\frac{V_3}{V_2}\left(cV_1 + \frac{1}{C_2R_1}\int V_1 dt + K_2 - V_2\right) \qquad (21)$$

i.e., $V_{out}$ is a function both of the input potential $V_1$ and of the time integral of that input potential.

In particular, it will be seen that if the potentials $V_3$ and $V_2$ are maintained constant, then the circuit of FIGURE 14 behaves as a controller which has both proportional action and integral action.

It is to be understood that the circuit of FIGURE 14 can be modified as described with reference to the preceding figures. In particular, the switches 6 and 7 may be electronic switches.

In one particular modification of the circuit of FIGURE 14, the terminal 9 and the resistor $R_1$ are omitted, and the input voltage $V_1'$ to the circuit is applied to an input terminal 91 which is connected, via a resistor $R_1'$, to the common point 90. It may be shown, for the modified circuit, that $$V_{out} = -\frac{V_3}{V_2} \cdot \frac{1}{R_1'C_2} \int V_1' dt + K_3 \qquad (22)$$

where $K_3$ is a constant, i.e. the modified circuit acts as an integrating circuit which differs from the unmodified circuit in that the output signal $V_{out}$ contains no term proportional to the input voltage $V_1'$.

Figure 15:
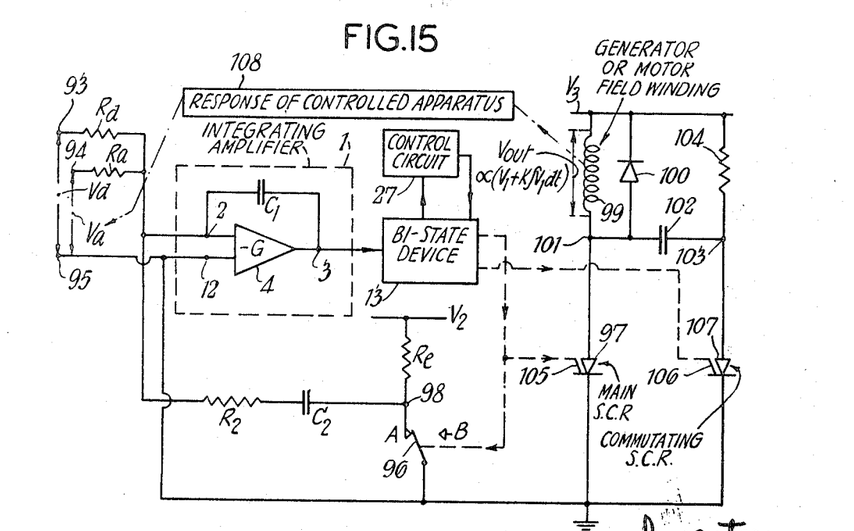
FIGURE 15 is a circuit diagram of a device, according to the invention, for providing an electrical signal which is a function of the time integral of an electrical input signal.

The circuit of FIGURE 15 is of a controller according to the invention. The circuit operates similarly to that of FIGURE 14, and oscillates similarly to the circuits described with reference to the preceding figures: corresponding circuit elements are therefore denoted by the same reference numerals and letters.

In the circuit of FIGURE 15, there are three input terminals to the complete circuit, the terminals 93, 94 and 95. The terminals 93 and 94 are connected, respectively via resistors $R_d$ and $R_a$, to the inverting input terminal 2 of the amplifier unit 4. The terminal 95 is directly connected to the non-inverting input terminal 12 of the amplifier unit 4. The terminal 2 is connected, via a resistor $R_2$, a capacitor $C_2$ and a resistor $R_e$, to a D.C. supply line of potential $V_2$. The electrical switch 96 (FIGURE 15) corresponds to the switch 6 of FIGURE 14, and is so arranged that, when the bi-state device 13 is in its state A, the junction point 98 of the resistor $R_e$ and the capacitor $C_2$ is connected to earth, while, when the bi-state device 13 is in its state B, the point 98 is not connected to earth. The resistance value of the resistor $R_e$ is small, compared with that of the resistor $R_2$.

In the circuit of FIGURE 15, the load comprises the field winding 99 of an electric generator or motor, and the winding 99 is connected, in series with a silicon-controlled-rectifier 97 of the polarity indicated, between earth and a D.C. supply line of potential $V_3$. The field winding 99 is shunted by a rectifier 100 of the polarity indicated. The common point 101 of the field winding 99 and the silicon-controlled-rectifier 97 is connected, via a capacitor 102, to a common point 103. The common point 103 is connected, on the one hand, via a resistor 104, to the D.C. supply line of potential $V_3$, and, on the other hand, via a further silicon-controlled-rectifier 107 of the polarity indicated, to earth.

The main silicon-controlled-rectifier 97 (FIGURE 15) corresponds to the electric switch 7 of FIGURE 14, while the silicon-controlled-rectifier 107 is an auxiliary switch which is employed to ensure that the silicon-controlled-rectifier 97 ceases to conduct current when it is required to do so. The arrangement is such that, when the bi-state device 13 is in its state A, it so biasses the control electrode 105 of the silicon-controlled-rectifier 97 that that rectifier will conduct current; when the bi-state device 13 is in its state B, the rectifier 97 is required to cease to conduct, and this is effected by the bi-state device 13, which so biasses the control electrode 106 of the silicon-controlled-rectifier 107 that the rectifier 107 commences to conduct current and thereby causes the rectifier 97 to cease to conduct current.

The circuit of FIGURE 15 is such that the multiplying factors $a$ and $b$, referred to in connection with FIGURES 14 and 1, are both constant and equal to zero. It will thus be seen that the average value $V_{out}$ of the potential difference developed across the field winding 99 will have the form of the expression 21 above, where $$\frac{V_1}{R_1} = \frac{V_a}{R_a} - \frac{V_d}{R_d} \qquad (23)$$

where $V_a$ and $V_d$ are potential differences of relatively opposite polarities, which are respectively applied between the terminals 94 and 95, and the terminals 93 and 95, and which respectively represent the achieved and the demanded values of a variable quantity which the controller of FIGURE 15 is required to control. The motor or generator having the field winding 99 will thus be arranged, in generally known manner, to tend to act to change the achieved value of the variable quantity (this action being represented in FIGURE 15 by the block 108), in the sense to make that achieved value more nearly equal to the demanded value.

During the periods when the bi-state device 13 is in its state A, the rectifier 105 will conduct, and the capacitor 102 will become charged, via the resistor 104. When the bi-state device 13 moves to its state B, the rectifier 97 is required to cease to conduct, but it will not do so unless the current flowing through it is interrupted. However, when the bi-state device 13 moves to its state B, the rectifier 107 will commence to conduct, with the result that the potential of that plate of the capacitor 102 which is connected to the common point 101 will instantaneously decrease below earth potential, thus causing the rectifier 97 to cease to conduct. Thereafter, while the bi-state device 13 remains in its state B, the rectifier 107 conducts current which passes through the resistor 104, and the capacitor 102 will become charged in the relatively opposite direction to previously, so that, when the bi-state device returns to its state A, the rectifier 107 will be caused to cease to conduct, by an action similar to that described for the case of the rectifier 97. The purpose of the rectifier 100 is to provide a discharge path for the inductive voltages which are inducted in the winding 99 when the current flowing through it is interrupted.

It is to be understood that the circuit of FIGURE 15 may be modified as described above with reference to the preceding figures. In particular, the switch 96 may be a suitable electronic switch, while the rectifiers 97 and 107 may be other forms of switches.

One important possible modification of the invention will now be discussed. The accompanying FIGURES 1 and 6–14 show various forms of pulse width modulators according to the invention. In the circuits of those figures, the switch 6 of FIGURE 1 or the equivalent switch or switches in the remaining figures, is arranged to alternatively connect two voltage sources of potentials $V_2$ and $-aV_2$ to one terminal of the resistor $R_2$ or its equivalent resistors. It is to be understood that (with the exception of the circuits of FIGURES 14 and 15), those two voltage sources may be replaced by two current sources which respectively supply currents $I_2$ and $-aI_2$ to the same one terminal of the resistor $R_2$. Furthermore, in the circuits of FIGURES 1 and 6–14, the switch 7 of FIGURE 1, or the equivalent switch or switches in the remaining figures, is arranged to alternatively connect two further voltage sources of potentials $V_3$ and $-bV_3$ to the output terminal 8 or its equivalent. It is to be understood that the two further voltage sources may be replaced by two current sources which respectively supply currents $I_3$ and $-bI_3$ to the output terminal 8 or its equivalent.

Figure 16:
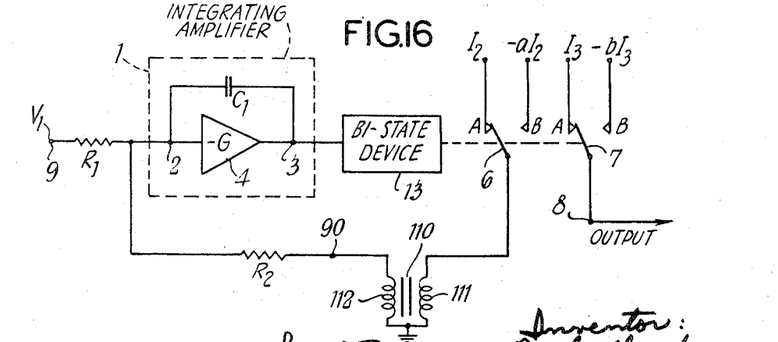
FIGURE 16 illustrates a modification of the circuit of FIGURE 14.

Such a modification is illustrated by FIGURE 16 which shows an integrating circuit similar to that of FIGURE 14 but having the capacitor $C_2$ (FIGURE 14) replaced by a transformer 110. The movable contact of the switch 6 is connected to earth, via the primary winding 111 of the transformer 110, while the common point 90 is connected to earth, via the secondary winding 112 of the transformer 110.

It will be observed that the circuit of FIGURE 16 is otherwise identical to the circuit of FIGURE 14, except in that four current sources have been substituted for the four voltage sources, in the manner described above.

It may be shown that the circuit of FIGURE 16 operates similarly to the circuit of FIGURE 14.

I claim:

1. A pulse width modulator comprising a first input line for receiving a first electrical input signal, a second input line for receiving a second electrical input signal, the first and second input signals being combined to form an effective electrical input signal, an integrating circuit responsive to the effective input signal to generate an electrical output signal, the magnitude of which is a function of the time integral of the magnitude of the said effective input signal, first switching means connected to the second input line and arranged to respond to the magnitude of the said output signal to assume a first state to switch the magnitude of the second input signal to a first value as a result of that output signal attaining a first selected value and to assume a second state to switch the magnitude of the second input signal to a second value as a result of that output signal attaining a second selected value different from the first selected value, the said first and second values of the magnitude of the said second input signal being so selected that, each time the first switching means operates, the polarity of the said effective input signal is reversed such that oscillation occurs, and means for generating an electrical load signal whose magnitude varies between first and second values in synchronism with the first switching means whereby the load signal is pulse width modulated, and in which the first switching means is arranged to effectively connect the second input line to first and second difference sources by way of a reactance whereby the average value of the load signal is a function of the time integral of the magnitude of said first electrical input signal.

2. A pulse width modulator according to claim 1 in which the first and second different sources are voltage sources and the reactance is a capacitance which is connected in series with a resistor in the second input line.

3. A pulse width modulator according to claim 2 in which the first input line is connected to the second input line between the capacitance and the resistor.

4. A pulse width modulator according to claim 1 in which the first and second different sources are current sources and the reactance is an inductance.

5. A pulse width modulator according to claim 1 in which that ratio of the first and second values of the second input signal is different from 1.

6. A pulse width modulator according to claim 1 including a control circuit arranged to control the points of switching of the first switching means to thereby control the frequency of the oscillation of the modulator.

7. A modulator according to claim 1 wherein the ratio of the first and second values of the second input signal is selected to be equal to the ratio of the first and second values of the said load signal.

8. A modulator according to claim 1, wherein the means for generating an electrical load signal includes second switching means arranged to effectively control the connection of third and fourth different sources to a load, the second switching means acting in synchronism with the first switching means.

9. A modulator according to claim 8 wherein the first and second switching means include a common single bi-state device arranged to respond to the magnitude of the said output signal to assume a first condition as a result of that output signal attaining its said first selected value and to assume a second condition as a result of that output signal attaining its said second selected value, the bi-state device being arranged to control the operation of a first switch or switches to switch the magnitude of the second input signal to its said first and second values respectively according as the bi-state device assumes its first or its second condition and being arranged to control the operation of a second switch or switches to switch the magnitude of the said load signal to its said first and second selected values respectively according as the bi-state device assumes its first or its second condition.

10. A modulator according to claim 9, which includes a control circuit associated with the bi-state device and arranged to control the difference between the said first and second selected values of the said output signal to which the bi-state device responds to thereby control the frequency of oscillation of the modulator.

11. A modulator according to claim 5, wherein the magnitude of one of the said first and second values of the second input signal is zero.

References Cited

UNITED STATES PATENTS

| | | | |
|---|---|---|---|
| 2,913,675 | 11/1959 | Curtis | 307—265 X |
| 3,112,365 | 11/1963 | Kihara | 332—9 X |
| 3,359,498 | 12/1967 | Harris | 328—57 |
| 3,384,838 | 5/1968 | Knutrud | 332—12 X |

ALFRED L. BRODY, *Primary Examiner.*

U.S. Cl. X.R.

307—265; 325—142; 328—58